United States Patent [19]

Shockley

[11] 4,206,613
[45] Jun. 10, 1980

[54] AIR CONDITIONER CONTROL SYSTEM

[76] Inventor: Norman E. Shockley, Apt. H3, 1199 Murfreesboro Rd., Nashville, Tenn. 37217

[21] Appl. No.: 954,358

[22] Filed: Oct. 25, 1978

[51] Int. Cl.² .............. B60H 3/04; F16D 23/00; B62D 45/00; F22B 5/02
[52] U.S. Cl. .................. 62/133; 192/0.03; 307/10 R; 62/323; 123/198 R
[58] Field of Search ............ 62/133, 158, 243, 323 C; 192/0.03, 0.07, 0.075, 0.096, 84 R, 0.02 R; 123/198 R, 197 C; 310/92, 94; 361/196; 307/10 R

[56] References Cited

U.S. PATENT DOCUMENTS

| | | | |
|---|---|---|---|
| 3,121,314 | 2/1964 | Koyanagi | 62/133 |
| 3,606,764 | 9/1971 | Yokouchi et al. | 123/198 R |
| 3,813,894 | 6/1974 | Bonnaud | 62/323 C |
| 3,914,663 | 10/1975 | Johnson | 307/10 R |
| 4,135,368 | 1/1979 | Mohr et al. | 62/133 |
| 4,142,375 | 3/1979 | Abe et al. | 62/158 |
| 4,155,225 | 5/1979 | Upchurch, Jr. | 62/133 |

Primary Examiner—William E. Wayner
Assistant Examiner—Harry B. Tanner
Attorney, Agent, or Firm—Harrington A. Lackey

[57] ABSTRACT

An air conditioning control system for an automotive vehicle including a timer circuit connecting the ignition circuit to a compressor switch means, functioning to turn off the air conditioner compressor for a predetermined timing period after the ignition switch is turned on. The system also includes an inertial switch, such as a mercury switch, which is rendered conductive when the forward acceleration and/or grade of the vehicle attains a predetermined value. The conduction of the inertial switch immediately de-actuates the air conditioner compressor, and the air conditioner compressor remains inoperative as long as the inertial switch is conductive and for the predetermined timing period of the timer circuit after the inertial switch is rendered non-conductive.

9 Claims, 2 Drawing Figures

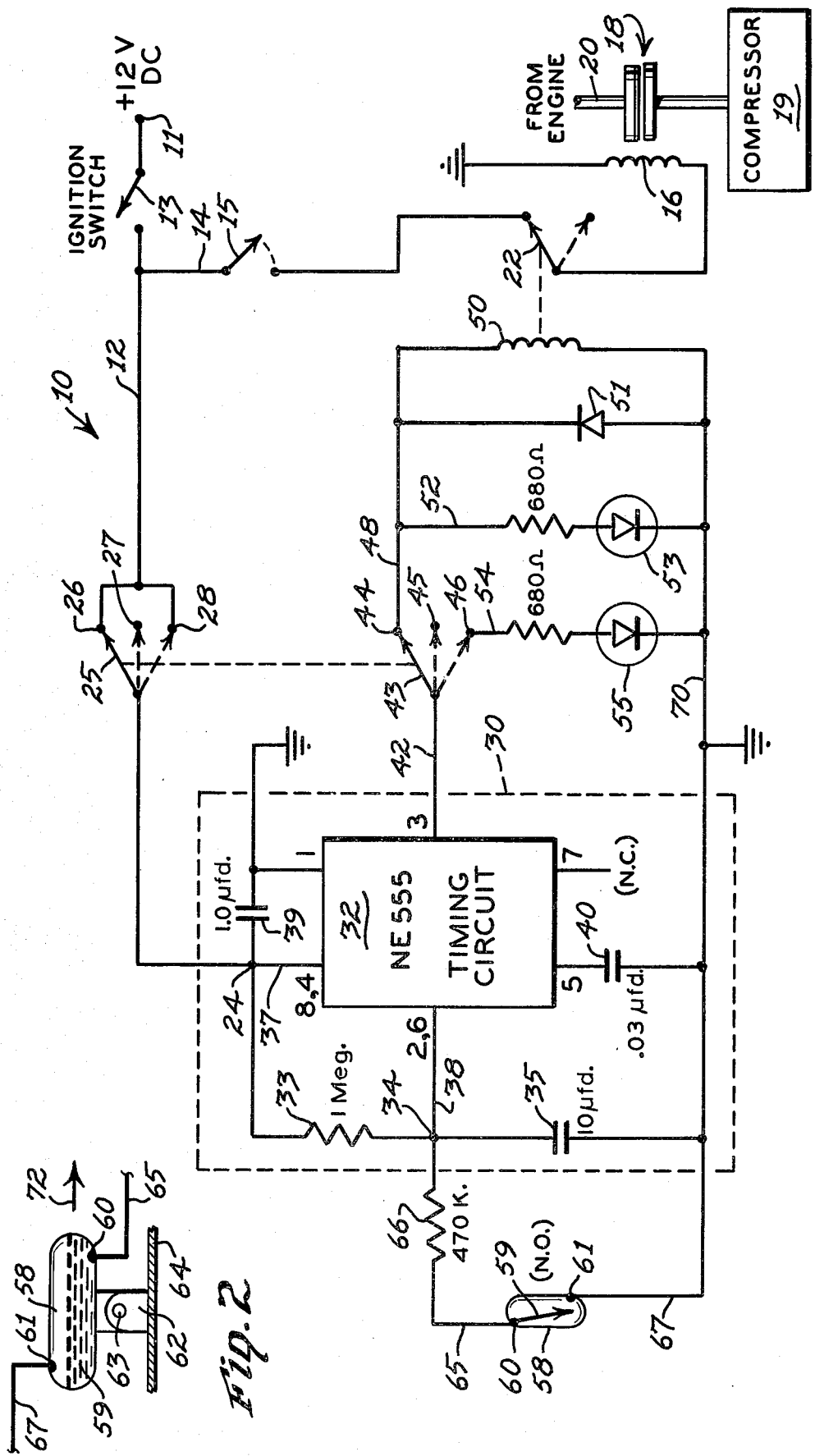

4,206,613

AIR CONDITIONER CONTROL SYSTEM

BACKGROUND OF THE INVENTION

This invention relates to an air conditioner control system, and more particularly to an air conditioner control system for an automotive vehicle.

Air conditioner control systems for automotive vehicles are known in the art for de-actuating the air conditioner compressor under excessive engine loads. However, such control systems usually employ pressure or vacuum type switches responsive to the fluid pressure in the intake manifold of the automotive engine. Such systems are disclosed in the following U.S patents:

U.S. Pat. No. 3,462,964 Haroldson, Aug. 26, 1969
U.S. Pat. No. 3,678,700 Bozich, July 25, 1972
U.S. Pat. No. 3,918,543 Halem, Nov. 11, 1975

Another type of air conditioner control system includes a sensor switch for detecting the engine speed, as disclosed in the Yonezu U.S. Pat. No. 3,664,148 issued May 23, 1972.

SUMMARY OF THE INVENTION

It is an object of this invention to provide an air conditioner control system for an automotive vehicle including a timer circuit responsive to the energization of the ignition circuit and also to an inertial switch which senses the acceleration of the vehicle.

The timer circuit includes an RC circuit connected between the ignition circuit and a biasing circuit for energizing a switch means for actuating and de-actuating the air conditioner compressor. The inertial switch is connected across the capacitor in the RC circuit.

The timer circuit is so designed that when the ignition is turned on, the timer circuit renders the biasing circuit conductive to de-energize the compressor switch and de-actuate the air conditioner compressor for a predetermined period while the automotive vehicle is being started and initially accelerated. Thus the load of the air conditioner compressor is removed from an overloaded engine during the starting period.

When the vehicle is rapidly accelerated from any running speed, the inertial switch will be closed to again render the biasing circuit conductive to de-actuate the air conditioner compressor. The air conditioner compressor will continue to be de-actuated as long as the inertial switch is closed, and for the predetermined time period of the timer circuit after the inertial switch is opened. Thus the timer circuit provides a delay before the compressor is re-actuated to prevent rapid interruptions of the operation of the compressor during inadvertent or short periods of acceleration and deceleration.

The control system may also include a signal circuit connected in the biasing circuit across the biasing element, with a manual switch for selectively connecting either the biasing element or the signal circuit to the timing circuit. When the switch is connected to the biasing element then the system is armed for de-actuating the compressor during periods of overloading. When the switch is turned to connect the signal circuit, the system may be used as an educational or a training system to indicate to the operator the periods of excessive acceleration, and to teach the motor vehicle operator to operate the accelerator pedal more gradually.

BRIEF DESCRIPTION OF THE DRAWINGS

FIG. 1 is a schematic circuit diagram of the air conditioning control system made in accordance with this invention; and FIG. 2 is an enlarged sectional schematic view of the mercury switch in non-conducting position.

DESCRIPTION OF THE PREFERRED EMBODIMENT

Referring now to the drawings in more detail, FIG. 1 discloses a schematic electrical circuit diagram of the air conditioning control system 10.

Power is supplied to the control system 10 from a 12-volt DC power source 11, such as the automobile battery, through the ignition circuit 12 including the ignition switch 13.

Connected to the ignition circuit 12 is the air conditioner compressor circuit 14 including the manual air conditioner control switch 15 and clutch coil 16 in series. The clutch coil 16, when energized, electromagnetically causes the faces of the clutch 18 to engage, in order to couple the air conditioner compressor 19 to the drive shaft 20 from the engine in order to actuate the vehicle air conditioning system.

Also connected in the compressor control circuit 14 is an automatic compressor switch 22, which is controlled by the system 10 for actuating and de-actuating the air conditioner compressor 19.

The ignition circuit 12 is connected to an input terminal 24 by a manual 3-pole or 3-position switch 25. Each terminal of the switch 25 is identified as poles 26, 27, and 28.

The input terminal 24 receives the input signal for the the timer circuit 30, which basically includes an integrated timing circuit 32, specifically in the form of an NE555 electronic component, coupled to an RC circuit. The RC circuit includes resistor 33 connected in series through junction 34 with the timing capacitor 35.

Input terminal 24 is connected into the integrated timing circuit through input lead 37 connected to the contacts 3, 4.

The integrated timing circuit 32 is connected through its contacts 2, 6 to junction 34 in the RC circuit through lead 38.

The input terminal 24 is also connected to contact 1 and to ground through capacitor 39.

Contact number 5 of the integrated timing circuit 32 is connected to ground through capacitor 40.

The output lead 42 is coupled to contact 3 of the integrated timing circuit 32 and to multi-pole switch 43 having 3 contact terminals or poles, 44, 45, and 46. The contact terminal 44 is connected to biasing circuit 48 including a biasing element to actuate the automatic compressor switch 22. In the specific embodiment disclosed in FIG. 1, the biasing element is in the form of a relay coil 50 and the automatic compressor switch 22 is in the form of a relay switch in a normally closed position when the relay coil 50 is de-energized. When the relay coil 50 is energized, the relay switch 22 is moved to its dashed-line open position to open the compressor circuit 14, de-energize the clutch coil 16 to disengage the clutch 18 and de-actuate the air conditioner compressor 19.

It will be understood, of course, that the relay coil 50 and relay switch 22 could be substituted for other types of biased switching devices, such as a triode in which the biasing element would be the grid of the triode, or a transistor.

Connected in parallel across the relay coil 50 is a diode 51 and also a signal circuit 52. The signal circuit 52 includes a pilot light in the form of an LED 53 adapted to illuminate with a red color when energized, in order to indicate that the biasing circuit 48 is energized and that the air conditioner compressor 19 is turned off.

Terminal 46 is connected to a second signal circuit 54 including another signal lamp in the form of an LED 55, adapted to illuminate with a green color.

Connected in parallel across the timing capacitor 35 is an inertial switch 58, preferably in the form of a mercury switch, as disclosed in FIG. 2. The inertial switch 58 has a switch element or bridge 59, in the form of the mercury, for bridging or contacting a pair of electrodes 60 and 61, when the forward acceleration of the vehicle is sufficient to force the mercury to rise at the rear end of the switch capsule and contact the rear electrode 61, or until the forward end of the mercury switch 58 is tilted upward until the level of the mercury covers both the electrodes 60 and 61.

As disclosed in FIG. 2, the mercury switch 58 is pivotally mounted by pivot pin 63 upon a bracket 62 fixed to a part of the vehicle frame 64.

The base electrode 60 of the inertial switch 58 is connected through lead 65 and resistor 66 to the RC junction 34, and the free electrode 61 is connected through lead 67 to ground through common line 70.

The lead 67, capacitor 35 and 40, signal circuits 54 and 52, diode 51 and the relay coil 50 are all grounded through common line 70.

In the operation of the system 10 upon an air conditioning system in an automotive vehcile, the automatic compressor switch 22 is connected in the existing air conditioning control circuit 14. The main switch 25 is connected in the ignition circuit 12, and the inertial switch 58, in the form of a mercury switch, is mounted upon an existing portion of the vehicle frame 64, in a substantially horizontal position, with the forward direction of the vehicle indicated by the arrow 72 in FIG. 2.

When the operator of the vehicle gets into his motor vehicle on a hot summer day, the conventional air conditioner switch 15 is usually in a closed position, having been left in that position from the previous time the operator drove the vehicle and had his air conditioner on.

Moreover, in its starting position, the relay compressor switch 22 is normally closed in the solid-line position disclosed in FIG. 1. The manual switch 25 and the ganged multi-pole switch 43, as disclosed in FIG. 1, are in their uppermost positions engaging the respective contacts or poles 26 and 44.

The mercury switch 58 is normally open in its rest or inoperative position.

The operator then starts his vehicle by closing the ignition switch 13 which permits electrical current from the 12-volt DC power source 11 to enter the timer circuit 30 through the input terminal 24 and energize the integrated timing circuit 32. Such energization causes current to pass through the output lead 42, switch 43, and contact 44 to cause the biasing circuit 48 to conduct. The conductive biasing circuit 48 energized the relay coil 50 which immediately moves the automatic switch 22 to its open, dash-line position, disclosed in FIG. 1, immediately de-energizing the clutch coil 16, disengaging the clutch faces 18 to turn off the air conditioner compressor 19.

Closing the ignition switch 13 also causes the timing capacitor 35 in the timer circuit 30 to commence charging, and thereby commence the timing period of the timer circuit 30.

From the moment the integrated timing circuit 32 is energized, it compares the voltages between the junctions 24 and 34. After the timing capacitor 35 has been charged to a predetermined voltage so that the timing circuit 32 reads a reduced voltage across the terminals 34 and 24 comparable to a predetermined threshhold value, the timing circuit 32 is turned off to render the biasing circuit 48 non-conductive, thus de-energizing the relay coil 50, and permitting the automatic compressor relay switch 22 to return to its closed position and re-actuate the air conditioner compressor 19.

The value of the timing period, such as 10 or 15 seconds, permits the operator of the vehicle to start his automobile and be well under way at a normal running speed before the air conditioner compressor is actuated, thereby adding the load of the compressor 19 to the load of the engine when the load upon the engine is otherwise minimal.

If for some reason, the vehicle is slow in starting so that the vehicle is still in a rapid phase of acceleration when the timing period of the circuit 30 terminates, then the inertial switch 48 will be closed by the inertia of the switch bridge or mercury 59 reacting to the forward acceleration forces of the vehicle to bypass the timing capacitor 35 and maintain the biasing circuit 48 in a conductive condition to continue to de-actuate the air conditioner compressor 19.

After the inertial switch 59 opens, due to the reduction of the acceleration forces upon the vehicle, the timing capacitor 35 will commence charging and the biasing circuit 48 will remain conductive during the predetermined timing period of the timer circuit 30.

The inertial switch 58 will function in the same manner for other situations in which the vehicle is rapidly accelerating and thereby creating an additional or exceptional load upon the engine, causing de-actuation of the air conditioner compressor 19 during this overloaded condition. Such situations would arise where the motor vehicle operator is attempting to pass another vehicle, or is attempting to increase his speed on the entrance ramp to an interstate highway, or where it is necessary to accelerate the vehicle in order to avoid an accident.

Moreover, where the vehicle is on a grade, such as moving uphill, but under reduced acceleration, the tilt of the mercury switch 58 permits energization of the switch under the extra load of the engine pulling the vehicle up the hill, even though the threshhold acceleration is substantially less than if the vehicle were on a level grade.

By the same token, when the vehicle is proceeding downhill, it will require an even greater acceleration value to cause the mercury switch 58 to close, which is desirable since the vehicle engine is under less load and stress than if it were moving on a level surface.

The inertial switch 58 is preferably mounted upon a pivotal mount 62 so that the angle of tilt of the mercury switch 58 with the longitudinal axis of a vehicle may be adjusted to the desired threshhold for causing the inertial switch 58 to close and de-actuate the air conditioner compressor 19.

The signal light 53 is merely to indicate to the operator of the vehicle when the compressor is de-actuated by the energization of the biasing circuit 48.

Should the operator desire the system 10 to be continually inoperative, he merely moves the switch 25 to the contact 27 which will automatically cause the switch 43 to engage the contact 45, to break the ignition circuit 12 to the timer circuit 30, and also to break the biasing circuit 48.

For purposes of instructing or educating a student or novice operator, the switches 25 and 43 may be shifted to contact the terminals 28 and 46, respectively, which will permanently open the biasing circuit 48 so that the control of the air conditioner compressor 19 is no longer responsive either to the ignition circuit or the inertial switch 58.

However, the signal lamp 55, which is preferably of a different design to emit a different color of illumination than the pilot lamp 53, such as green as opposed to red, will illuminate during the starting of the vehicle and also during the rapid acceleration exceeding the threshhold value, and also during the extended time period of the timing circuit after the starting of the vehicle, or after the opening of the inertial switch 58. Thus, a student operator can learn to drive the vehicle without accelerating the vehcile too fast, by observing the illumination or non-illumination of the signal lamp 55, it is estimated that the use of the air conditioner control system 10 to de-actuate the air conditioner compressor 19 during periods of normally exceptional loads upon the engine, will substantially reduce fuel requirements of the vehicle, as well as overheating of the engine. Moreover, the vehicle will perform more smoothly and safely when the load of the air conditioner compressor 19 is removed from an already highly-loaded engine during start-ups and high acceleration periods.

What is claimed is:

1. An air conditioner control system for an automotive vehicle, including a vehicle frame, an electrical power supply, an ignition circuit, an air conditioner compressor, and an electrically-controlled clutch for actuating and de-actuating the air conditioner compressor, comprising:
   (a) compressor switch means connected to said electrical power supply for actuating the air conditioner compressor when said compressor switch means is in an operative position and for de-actuating said compressor when said compressor switch means is in an inoperative position,
   (b) an electric timer circuit coupled to said electrical power source through said ignition circuit, and to said compressor switch means, said timer circuit functioning to render said compressor switch means inoperative when said ignition circuit is initially turned on and during the timing period of said timer circuit, said compressor switch means being rendered operative at the end of said timing period,
   (c) an inertial switch mounted on said vehicle frame, normally non-conducting, but being conductive when said vehicle frame attains a predetermined acceleration value and grade,
   (d) said inertial switch being coupled to said timer circuit, and functioning to render said compressor switch means inoperative while said inertial switch is conducting and during the timing period of said timer circuit after said inertial switch becomes non-conducting.

2. The invention according to claim 1 in which said timer circuit comprises an RC circuit, including a resistor and a capacitor connected in series with the ignition circuit, said inertial switch being connected in parallel with said capacitor.

3. The invention according to claim 2 in which said timer circuit further comprises an integrated timing circuit connected in series with the ignition circuit and in parallel with said RC circuit, a lead connecting said integrated timing circuit to the junction between said resistor and said capacitor to enable the integrated circuit to compare the voltage across the resistor with a predetermined threshhold voltage commensurate with the timing period of said timer circuit.

4. The invention according to claim 2 further comprising a biasing circuit connected to said timer circuit to render said compressor switch means operative when said biasing circuit is non-conducting and to render compressor switch means inoperative when said biasing circuit is conducting.

5. The invention according to claim 4 further comprising a biasing element in said biasing circuit for rendering said compressor switch means operative or inoperative, a signal circuit connected in parallel with said biasing element, a biasing switch connecting said timer circuit with said biasing element and said signal circuit, said biasing switch having a first position for connecting the timer circuit with said biasing element and disconnecting said signal circuit, and a second position for disconnecting said biasing element and connecting said signal circuit to said timer circuit.

6. The invention according to claim 5 in which said biasing switch has a third position disconnecting both said biasing element and said signal circuit from said timer circuit.

7. The invention according to claim 5 in which said signal circuit is a first signal circuit and further comprising a second signal circuit connected in parallel with said biasing element and adapted to be connected to said timer circuit when said biasing switch is in said first position, and to be disconnected from said timer circuit when said biasing switch is in said second position.

8. The invention according to claim 5 further comprising a manual timer circuit switch connecting said ignition circuit to said timer circuit and having three positions corresponding to the first, second and third positions of said biasing switch, said manual timer circuit switch being ganged with said biasing switch to move both switches simultaneously between said first position, said second position, and said third position.

9. The invention according to claim 1 in which said inertial switch is a mercury switch.

* * * * *